United States Patent [19]

Rowlette

[11] 4,405,697
[45] Sep. 20, 1983

[54] LEAD-ACID BATTERY

[75] Inventor: John J. Rowlette, Monrovia, Calif.

[73] Assignee: California Institute of Technology, Pasadena, Calif.

[21] Appl. No.: 268,484

[22] Filed: May 29, 1981

[51] Int. Cl.$^3$ .......................................... H01M 39/00
[52] U.S. Cl. .................................... 429/161; 429/245; 429/252
[58] Field of Search ............... 429/161, 252, 152, 153, 429/186, 162, 245, 149

[56] References Cited

U.S. PATENT DOCUMENTS

| | | | |
|---|---|---|---|
| 534,603 | 2/1895 | Ford | 429/161 |
| 537,474 | 4/1895 | McDougall . | |
| 608,714 | 8/1898 | Rively | 429/161 X |
| 704,739 | 7/1902 | Entz . | |
| 1,525,747 | 2/1925 | Kinsley | 429/161 X |
| 1,546,541 | 7/1925 | Jencick | 429/161 |
| 1,663,193 | 3/1928 | Danna | 429/161 X |
| 2,484,787 | 10/1949 | Grant | 429/252 X |
| 3,419,436 | 12/1968 | Recht et al. . | |
| 3,496,018 | 2/1970 | Hamlen et al. . | |
| 3,761,314 | 9/1973 | Cailley | 429/161 X |
| 3,884,719 | 5/1975 | Evans . | |

Primary Examiner—Anthony Skapars
Attorney, Agent, or Firm—Marvin E. Jacobs

[57] ABSTRACT

A light weight lead-acid battery (30) having a positive terminal (36) and a negative terminal (34) and including one or more cells or grid stacks having a plurality of vertically stacked conductive monoplates (10, 20) with positive active material and negative active material deposited on alternating plates in the cell or grid stack. Electrolyte layers (26, 28) positioned between each monoplate are included to provide a battery cell having four sides which is capable of being electrically charged and discharged. Two vertical positive bus bars (42, 43) are provided on opposite sides of the battery cell for connecting the monoplates (10) with positive active material together in parallel current conducting relation. In addition, two negative bus bars (38, 39) on opposite sides of the battery cell each being adjacent the positive bus bars are provided for connecting the monoplates (20) with negative active material together in parallel current conducting relation. The positive (42, 43) and negative (38, 39) bus bars not only provide a low resistance method for connecting the plurality of conductive monoplates of their respective battery terminals (36, 34) but also provides support and structural strength to the battery cell structure.

In addition, horizontal orientation of monoplates (10, 20) is provided in a vertical stacking arrangement to reduce electrolyte stratification and short circuiting due to flaking of positive and negative active materials from the monoplates.

15 Claims, 9 Drawing Figures

LEAD-ACID BATTERY

ORIGIN OF THE INVENTION

The invention described herein was made in the performance of work under a NASA contract and is subject to the provisions of Section 305 of the National Aeronautics and Space Act of 1958, Public Law 83-568 (72 Stat 435; 42 USC 2457).

TECHNICAL FIELD

The present invention relates generally to storage or secondary batteries. More specifically, the present invention relates to an improved light weight lead-acid battery.

BACKGROUND ART

The largest single application of lead-acid storage batteries is for the starting, lighting, and ignition of automobiles, trucks and buses. These batteries are charged automatically from a generator driven by the engine while it is running and they supply power for the lights while the engine is shut-down and for ignition and cranking when the engine is started. Lead-acid storage batteries are also widely used in aircraft and boats with virtually unlimited applications also existing in nonmotive situations.

Lead-acid batteries are made up of a series of lead-acid cells. A lead-acid cell consists essentially of positive plate containing positive active material such as lead dioxide and negative plates containing negative acid material such as sponge lead immersed in an electrolyte solution typically of dilute sulfuric acid. The respective positive and negative plates are connected in parallel with the power or current output of a cell being determined by the number and size of the plates. The open circuit potential developed between each positive and negative plates is about two volts. Since the plates are connected in parallel, the combined potential for each cell will be also about two volts regardless of the number of plates utilized in the cell. One or more cells are then serially connected to provide a battery of desired voltage. Common low voltage batteries are 6 volt batteries having three serially connected cells, 12 volt batteries with 6 serially connected cells and 24 volt batteries with 12 serially connected cells.

The positive and negative plates are typically oriented vertically in a horizontal stacked relationship. As a result of this vertical orientation, electrolyte stratification commonly occurs vertically along the plate surfaces. This results in diminishing of battery performance. Some attempts have been made to prevent electrolyte stratification, such as stirring of the electrolyte by various mixing systems. These mixing systems are not only cumbersome but are expensive and subject to failure during the life of a particular battery.

Another problem with lead-acid batteries is their limited lifetime due to shedding of the active materials from the positive and negative plates. Pasted plate lead-acid batteries are by far the most common type of lead-acid battery. Typically, a paste of lead oxide is applied to the surfaces of the positive and negative grids. By suitable electric forming, the lead oxide paste on the positive grid is oxidized to lead dioxide while the lead oxide on the negative plate is reduced by suitable electric forming to sponge lead. During continued operation of the lead-acid battery, shedding or flaking of the deposited lead paste is known to occur. The flakes of material fall down between the vertically oriented plates and accumulate on the battery bottom. After a period of time, sufficient flakes accumulate on the battery bottom to short circuit the negative and positive grids resulting in a dead battery cell and shortened battery life.

In the past, lead-acid batteries have been inherently rather heavy due to the use of lead in constructing the plates. Modernly, attempts have been made to produce light-weight lead-acid batteries especially in aircraft, electric cars and other vehicles where weight is an important consideration. Emphasis has been placed on producing thinner plates made from lighter weight materials used in place of and in combination with lead. Although the thinner lightweight plates are beneficial in reducing battery weight, they present problems in regards to providing a cell structure which is sufficiently strong and rigid to prevent structural failure during normal use.

It is therefore desirable to provide an improved low-voltage lead-acid battery which eliminates or substantially reduces common faults, i.e. shedding and electrolyte stratification that contribute to shortened battery life and which is in addition lightweight yet structurally strong.

SUMMARY OF THE INVENTION

In accordance with the present invention, a new approach to lightweight battery construction has been conceived. The well known shedding of lead compounds accumulating near the bottom of the plates or grids and causing leakage resistance between electrodes is eliminated. Also, stratification of the electrolyte is eliminated. In addition, the cell structure is strengthened by a unique orientation and connection of the positive and negative grids. The present invention has application to both lead-acid battery and other battery systems and structures.

The present invention is based upon the redesign of the positive and negative grids and the horizontal orientation or vertical stacking thereof. The horizontal orientation of the grids prevents the accumulation of flaked lead compounds at the battery bottom, since their downward movement is blocked by the underlying positive or negative plate. Further, any stratification of the electrolyte is limited to the interplate distance only.

As another feature of the present invention, the electrolyte is confined and contained within acid resistant felt pads between the positive and negative grid. This further contains the electrolyte to prevent stratification.

In another feature of the present invention, tabs are provided extending from two opposite edges of the plates or grids and running the total length of the grids on both sides thereof. The corresponding tabs for positive and negative plates are welded together or otherwise attached to a vertical plate to form vertical bus bars when the grids are stacked, thus providing high current carrying capacity to battery terminals. The negative and positive plates are stacked so that two positive tabs extend from the cell or grid stack on sides adjacent the two negative tabs. The common tabs on each side of the grid stack may be welded together, connected to a common plate or otherwise connected together in parallel to form four bus bars or plates extending vertically up the cell sides. This particular feature not only greatly reduces electrical resistance in the battery cell or grid stack but additionally provides rigidity and strengthening to the cell structure.

Also in accordance with the present invention, the assembled cell or stack of grids is placed in a water tight battery container and permanently sealed to prevent evaporation of the electrolyte. The assembled battery may include any number of cells from one cell for a two-volt battery up to twelve cells for a twenty-four volt battery and even more cells when higher voltages are required. In addition, different power requirements may be met by varying the number of grids or plates per cell. For a given total plate area, power is independent of the series/parallel arrangement. Only voltage can be varied.

In accordance with the present invention, the new approach to battery construction not only does away with well known lead compound flaking and electrolyte stratification problems but also provides an improved battery featuring redesigned positive and negative grids providing higher current densities and thinner grids per unit weight.

The above discussed and many other features and attendant advantages of the present invention will become apparent as the invention becomes better understood by reference to the following detailed description when considered in conjunction with the accompanying drawings.

DETAILED DESCRIPTION OF THE INVENTION

Referring first to FIGS. 1-4, a positive grid or monoplate is shown generally at 10. The positive monoplate may be made from any suitable relatively lightweight conductive material. In this embodiment, the positive monoplate 10 is made from 0.002 inch titanium sheet which is lead plated on both sides to between 0.003 and 0.005 inch thickness. The positive monoplate 10 includes two arcuate tabs 12 and 14. The tabs 12 and 14 extend along the entire length of the positive monoplate 10 and are located on opposite sides thereof. The tabs 12 and 14 may be made from any suitable conductive material and may be attached to the positive monoplate 10 in any convenient manner so long as electrical current may be conducted from the monoplate 10 to and through the tabs 12 and 14. Preferably, the tabs 12 and 14 are formed integrally from the positive monoplate 10 by stamping or bending opposite lateral edge portions to form integral tabs extending outward from opposite sides of monoplate 10. The width of the tabs and angle to which the tabs are bent may be varied so long as they will be oriented in a position when placed in the battery cell or stack to be welded or otherwise connected together to form a high strength bus bar. Although the positive monoplate 10 is preferably rectangular in shape, other shapes, such as a square are suitable.

Figure 1:
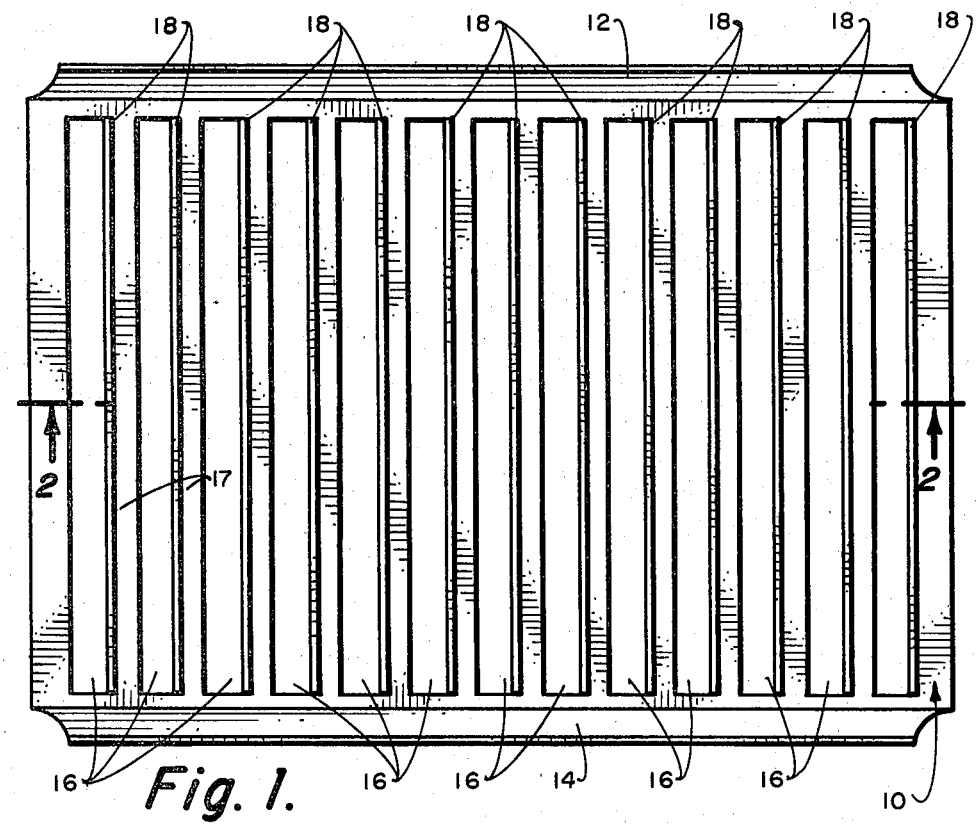
FIG. 1 is a top view of a preferred positive grid or monoplate in accordance with the present invention.
Figure 2:
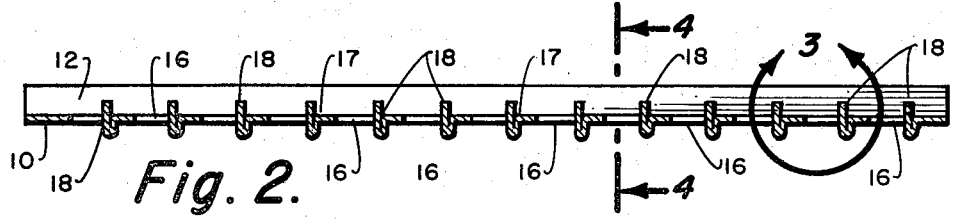
FIG. 2 is a view of FIG. 1 taken in the 2—2 plane.
Figure 3:
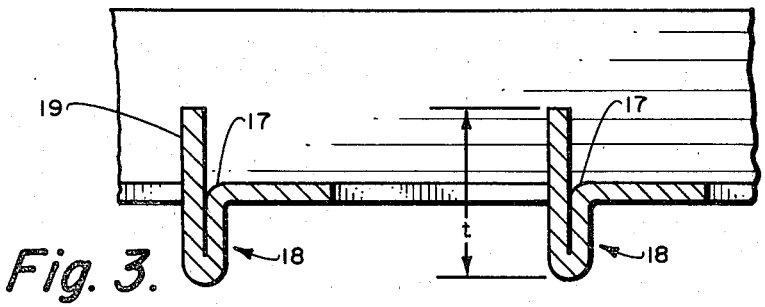
FIG. 3 is a detailed view of the grid fold structure of FIG. 2.
Figure 4:
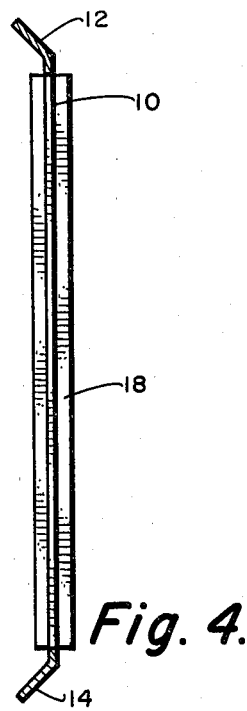
FIG. 4 is a view of FIG. 2 taken in the 4—4 plane.

In order to provide a suitable configuration for holding the positive active material on the positive plate and additionally for strengthening the positive monoplate 10, it is preferred that a plurality of elongated slots 16 be punched in the positive monoplate 10. The slots 16 are punched by punching out material on three sides only of the slot area so that the punched out material remains attached to the monoplate along one of the longer sides 17. The punched out material is then folded to form splines 18. A detailed view of the splines 18 is shown in FIGS. 2 and 3. The splines are folded so that a portion 19 of the punched out material extends outwardly at substantially right angles from the positive monoplate 10 on both sides of the monoplate 10. The splines 18 not only provide extra structural strength to the positive monoplate 10, but they additionally provide means for holding and containing the positive active material. The positive active material is typically a lead oxide paste (not shown) which is applied to the positive monoplate 10 to fill elongated slots 16. The amount of lead oxide paste applied to the positive monoplate 10 is sufficient to fill elongated slot 16 to a width equivalent of the width of splines 18 as represented by t in FIG. 3. The positive active material is then preferably electrically formed by oxidizing the lead oxide paste to lead dioxide.

Figure 7:
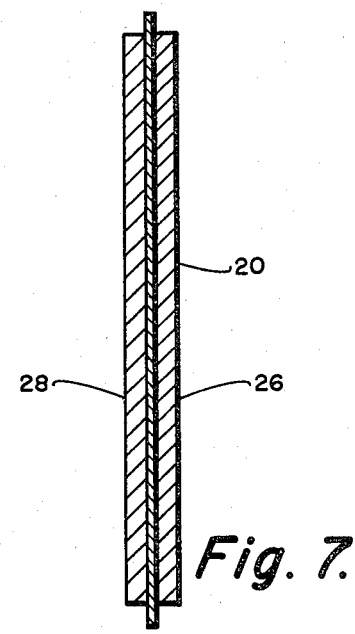
FIG. 7 is a view of FIG. 6 taken in the 7—7 plane.
Figure 5:
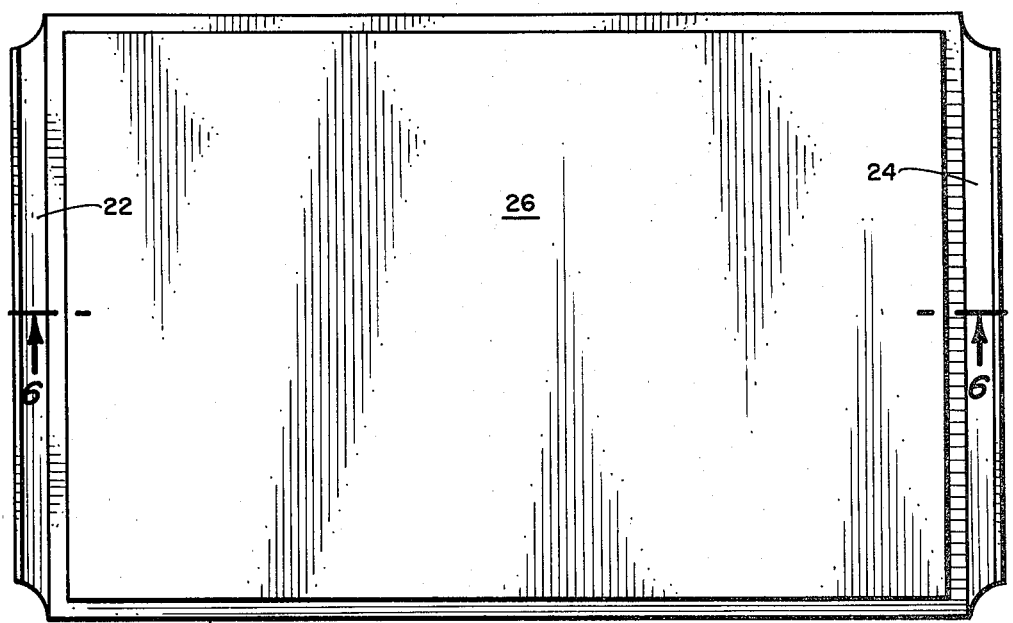
FIG. 5 is a top view of a preferred negative grid or monoplate in accordance with the present invention having electrolyte layers on both sides.
Figure 6:
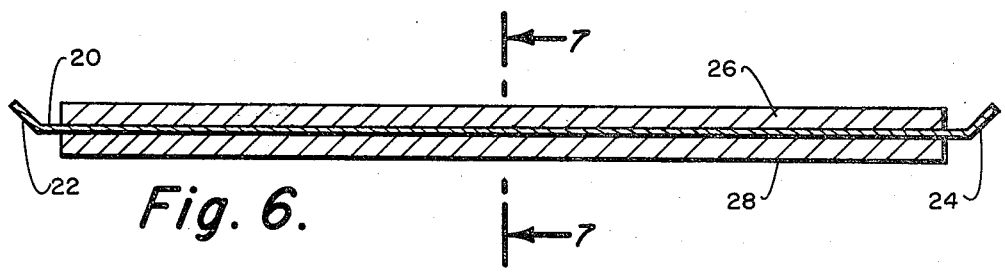
FIG. 6 is a view of FIG. 5 taken in the 6—6 plane.

Referring next to FIGS. 5-7, an exemplary negative grid or monoplate is shown at 20. The negative monoplate 20 may be made from aluminum or other lightweight plastic or inert structural material having a thin plate of lead thereon. The negative active material may be either lead oxide paste applied to the plate and reduced to sponge lead or other conventional negative active material. The negative monoplate 20 also includes conductive tabs 22 and 24. The tabs 22 and 24 may be made from any suitable lightweight conductive material and may be attached to the negative monoplate in any convenient manner. However, preferably the tabs 22 and 24 are formed integrally from the negative monoplate 20 by simply bending or stamping opposite lateral edge portions to form integral tabs extending outward from opposite sides of the monoplate 20.

As also shown in FIGS. 5-7, electrolyte layers 26 and 28 are provided on both sides of negative monoplate 20. The electrolyte layers 26 and 28 include conventional sulfuric acid electrolyte which is impregnated or otherwise absorbed into a layer of fibrous or porous acid resistant material such as asbestos or glass felt. The containment of the electrolyte within the glass or asbestos felt pads or layers 26 and 28 confines the liquid between the plates by capillary attraction. This prevents communication between the different electrolyte layers and the possibility of vertical stratification of the electrolyte.

Figure 8:
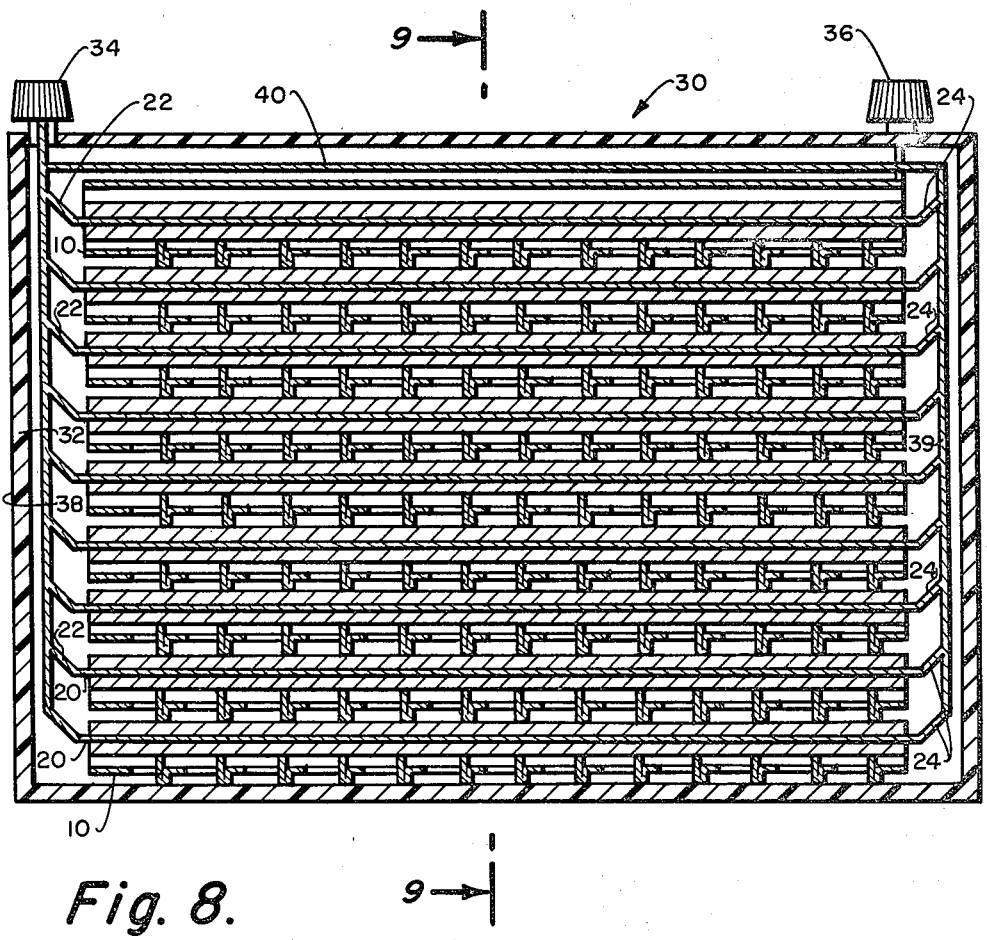
FIG. 8 is a side view of an assembled single cell lightweight lead-acid battery in accordance with the present invention.

FIG. 8 is a side sectional view of an exemplary bipolar battery in accordance with the present invention. The battery is shown generally at 30 and includes a battery case 32 made from conventional material and negative terminal 34 and positive terminal 36. The battery is sealed to prevent evaporation of electrolyte. The negative monoplates 20 and positive monoplates 10 are horizontally oriented and alternately stacked as shown in FIG. 8 to form a battery stack or cell. For simplicity, a single cell battery is shown in FIG. 8 where all of the positive and negative monoplates 10 and 20 are connected in parallel. The battery of FIG. 8 will have a potential of around two volts. The voltage of a battery may be increased by serially connecting added cells (not shown) indentical to those shown in FIG. 9. For example, if a twelve volt battery is desired, six cells may be serially connected.

As shown in FIG. 8, the electrolyte layers 26 and 28 by way of their positioning relative to negative monoplate 20 will be displaced between each of the positive and negative monoplates 10 and 20. The tabs 22 and 24 on the negative monoplate 20 are shown connected to bus plates 38 and 39 respectively. The bus plates 38 and 39 are flat sheets of conductive material which cover and are connected to the the conductive tabs 22 and 24. The bus plates 38 and 39 may be connected to the tab 22 and 24 by any convenient means such as soldering or welding. The bus bar plates 38 and 39 are wide enough to extend along the entire length of conductive tabs 22 and 24 and additionally are sufficiently long or high to extend from the bottom of the grid stack or cell up to the top.

Negative bus plate 38 is connected directly to negative terminal 34 as shown in FIG. 8. Although it is not absolutely necessary that negative bus plate 39 also be connected to negative terminal 34, it is desirable that connective conductive plate 40 be provided to connect negative bus plate 39 to negative terminal 34. By connecting both negative bus plates 38 and 39 to negative terminal 34, current is drawn from the negative monoplates 20 from two directions. By providing conductive tabs and bus bars on both sides of the negative monoplates 20, the effective resistance of the negative monoplate 20 is lowered and at the same time added structural strength is provided.

Figure 9:
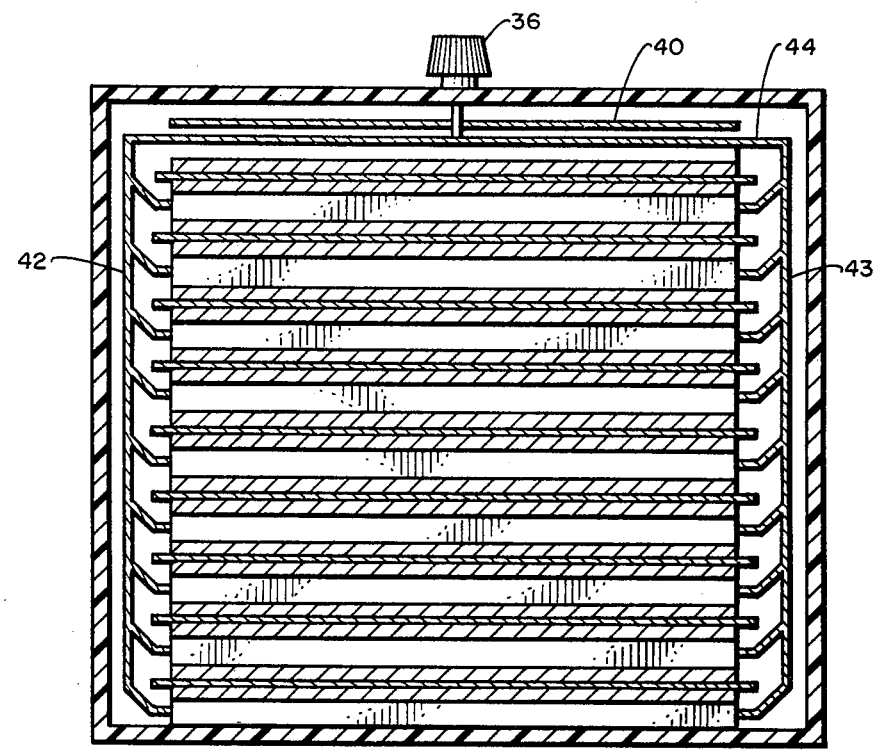
FIG. 9 is a view of FIG. 8 taken in the 9—9 plane.

As shown in FIG. 9, the positive monoplates 10 are also connected together by positive bus plates 42 and 43. Although various orientations for positive bus plates 42 and 43 are possible, it is preferred that bus plates 42 and 43 be oriented to protrude from the grid stack or battery cell at right angles to negative bus plates 38 and 39. The positive monoplates 10 are therefore oriented relative to the negative monoplates 20 so that the positive conductive tabs 12 and 14 protrude from the battery or grid stack on sides adjacent to the negative conductive tabs 22 and 24. The positive bus plates 42 and 43 may also be made from a suitable conductive sheet material with the positive bus plates 42 and 43 being connected to positive conductive tabs 12 and 14 by convenient means such as welding or soldering. As was the case with the negative bus plates, it is preferred that both positive plates 42 and 43 be connected to positive terminal 36. Therefore, positive connective conductive plate 44 is provided for connecting positive bus plate 42 to positive terminal 36. Positive bus plate 43 is connected directly to positive terminal 36. Again, since bus plates 42 and 43 are provided on both sides of positive monoplates 10, the resistance of the positive monoplates 10 are effectively reduced since current must only be conducted a maximum of half the grid length as opposed to a maximum of the entire grid length when only one bus plate is utilized. In addition, the provision of positive bus plates 42 and 43 on opposite ends of positive monoplate 10 provides for added structural strength to the battery or grid stack. If desired, instead of using separate bus plates which must be welded or soldered to the protruding tabs, the tabs may be bent at a sufficient angle and be of sufficient length so that they fold over or up to the next adjacent corresponding monoplate. The tabs are then simply welded together to form a strong integral bus bar.

Having thus described an exemplary embodiment of the present invention, it should be noted by those skilled in the art that the within disclosures are exemplary only of the various other alternatives, adaptations and modifications may be made within the scope of the present invention. Accordingly, the present invention is not limited to the specific embodiments as illustrated herein.

What is claimed is:

1. A battery having positive and negative terminals comprising a sealed casing:

one or more cells received in said casing serially connected in conductive relation wherein said cells include a plurality of horizontally oriented grids of alternately stacked positive and negative monoplates forming a vertical grid stack having four sides;

two vertical positive bus bar means, each connected to opposed side edges of each said positive monoplate for conducting current to said positive terminal and providing structural support to said grid stack; and two vertical negative bus bar means, each connected to the two opposed, remaining side edges of said negative monoplates for conducting current to said negative terminal and for further structurally supporting said grid stack.

2. A battery according to claim 1 wherein said bus bar means includes conductive plates covering substantially each side of said grid stack.

3. A battery according to claim 2 wherein said grids have tabs extending from opposite lateral edges and said conductive plates are formed by connecting said tabs together.

4. A battery according to claim 2 wherein horizontally orientally electrolyte layers are disposed between each set of opposed positive and negative monoplates, said electrolyte layers including a sheet of porous electrolyte resistant material impregnated with electrolyte solution directly in contact with the surface of said monoplates whereby said electrolyte solution in each electrolyte layer is contained within said porous acid resistant material by capillary action to prevent mixing of the electrolyte solutions in different electrolyte layers.

5. A battery having a positive terminal and a negative terminal comprising:

a sealed casing in which is received:

a plurality of positive conductive monoplates each having a layer of positive active material on both surfaces and having a first, integral, conductive tab extending continuously along one edge of said positive monoplate and a second integral, conductive tab extending continuously along an opposite edge of said positive monoplate, said positive monoplates being horizontally disposed and stacked vertically to form a grid stack having four vertical sides with the first conductive tabs on one grid stack side and the second conductive tabs on an opposite grid stack side;

a plurality of negative conductive monoplates each having a layer of negative active material on both surfaces and having a first, integral, conductive tab extending continuously along one edge of said negative monoplate and a second integral, conductive tab extending continuously along an opposite edge of said negative monoplate, said negative monoplates each being disposed horizontally and stacked vertically with alternating positive monoplates and negative monoplates;

a plurality of electrolyte layers of porous electrolyte impregnated material each of which is displaced between said positive and negative monoplates and directly in contact with said surfaces;

means for connecting the first tabs on said positive monoplates together in current conducting relation to form a first positive bus bar extending vertically up one side of said grid stack;

means for connecting the second tabs on said positive monoplates together in current conducting relation to form a second positive bus bar extending vertically up the side of said grid stack opposite said first positive bus bar;

means for connecting the first tabs on said negative monoplates together in current conducting relation to form a first negative bus bar extending vertically up a side of said grid stack adjacent said first positive bus bar;

means for connecting the second tabs on said negative monoplates together in current conducting relation to form a second negative bus bar extending vertically up the side of said grid stack opposite said first negative bus bar wherein said positive and negative bus bars provide at least a portion of the structural support to said grid stack; and means for connecting at least one of said positive bus bars and at least one of said negative bus bars to respective positive and negative battery terminals in current conducting relation whereby electrical energy generated in said grid stack is transferred to said battery terminals.

6. A battery according to claim 5 further including negative and positive conduction means for connecting both of said positive bus bars and both of said negative bus bars to their respective positive and negative battery terminals.

7. A battery according to claim 5 wherein said conductive tabs on said positive and negative monoplates are integral edge portions of the monoplates and are of sufficent width and bent at a sufficient angle to fold over the next adjacent positive monoplate in said battery stack.

8. A battery according to claim 7 wherein said monoplates are stacked so that the edge portions are all bent in the same direction and wherein said means for connecting said tabs together includes welded connections between said bent tabs.

9. A battery according to claim 5 wherein said electrolyte resistant porous material is selected from the group consisting of glass felt and asbestos felt.

10. A battery according to claim 5 wherein said positive monoplate includes lateral ribs to structurally strengthen said monoplate.

11. A battery according to claim 10 wherein said ribs are integrally folded from material punched from said monoplate.

12. A battery according to claim 5 wherein said positive active material is lead dioxide, said negative active material is lead and said electrolyte includes sulfuric acid.

13. A lead-acid battery having a positive terminal and a negative terminal comprising:

a grid stack including a plurality of vertically stacked conductive monoplates having a positive-active material and negative active material deposited on alternate plates in said grid stack with electrolyte layers positioned between each monoplate, said grid stack having four sides;

positive bus bar means on opposite sides of said grid stack for connecting said monoplates with positive active material together in parallel current conducting relation;

negative bus bar means on opposite sides of said grid stack adjacent said positive bus bar means for connecting said monoplates with negative active material together in parallel current conducting relation whereby said positive and negative bus bars provide support and structural strength to said grid stack; and means for connecting at least one of said positive bus bars and at least one of said negative bus bars to respective positive and negative battery terminals in current conducting relation whereby electrical energy generated in said grid stack is transferred to said battery terminals.

14. A battery according to claim 12 in which said positive monoplate is a sheet of lightweight material coated on each side with a layer of lead dioxide and the negative monoplate is a lightweight sheet coated on each said surface with a film of lead.

15. A battery according to claim 14 in which the sheet in the positive monoplate is titanium and the sheet in the negative monoplate is aluminum.

* * * * *